June 12, 1934.  S. BERGSTEIN  1,962,759
MACHINE AND METHOD FOR MAKING KNOCKDOWN BOXES
Filed Oct. 9, 1931    9 Sheets-Sheet 7

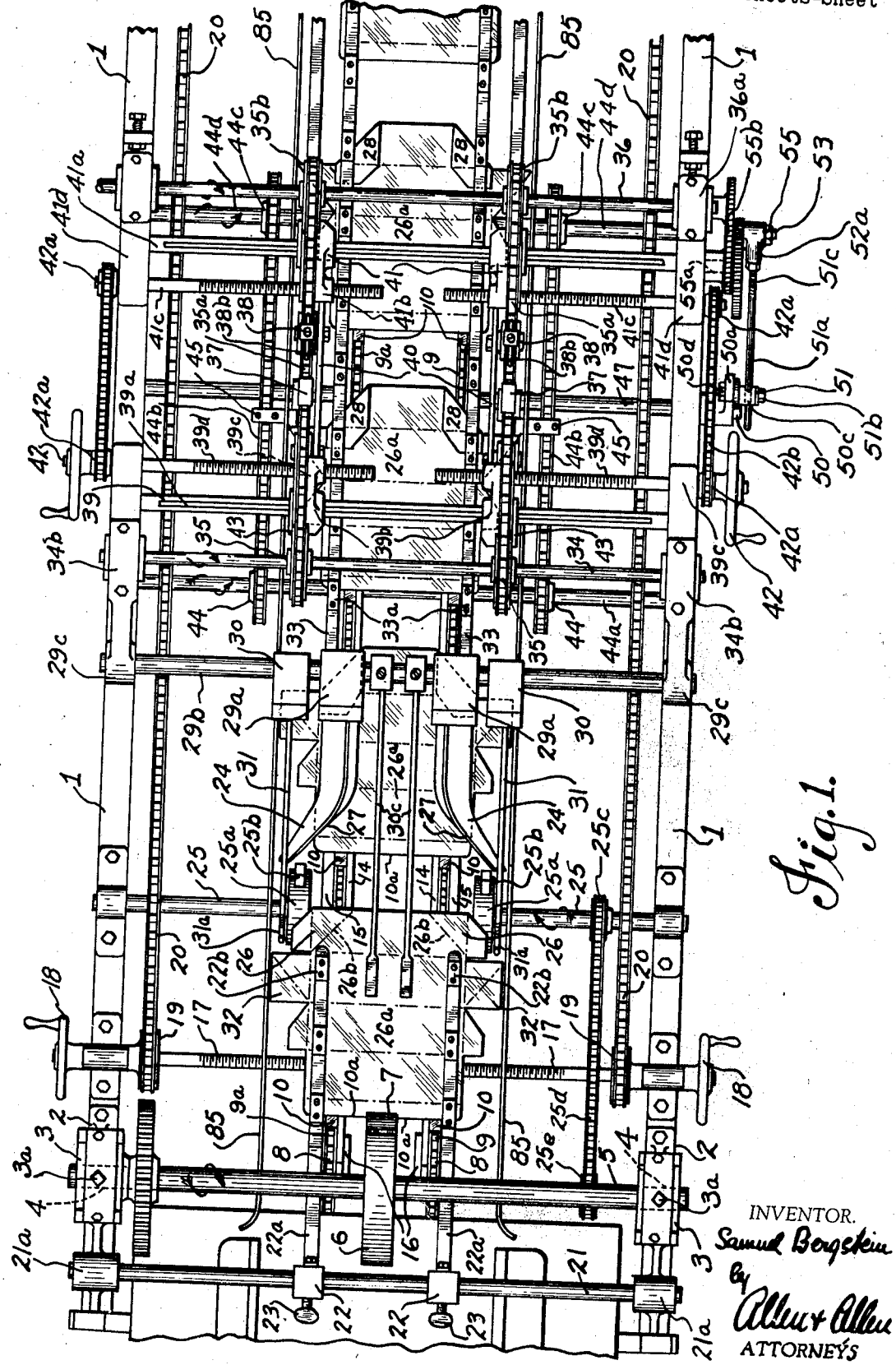

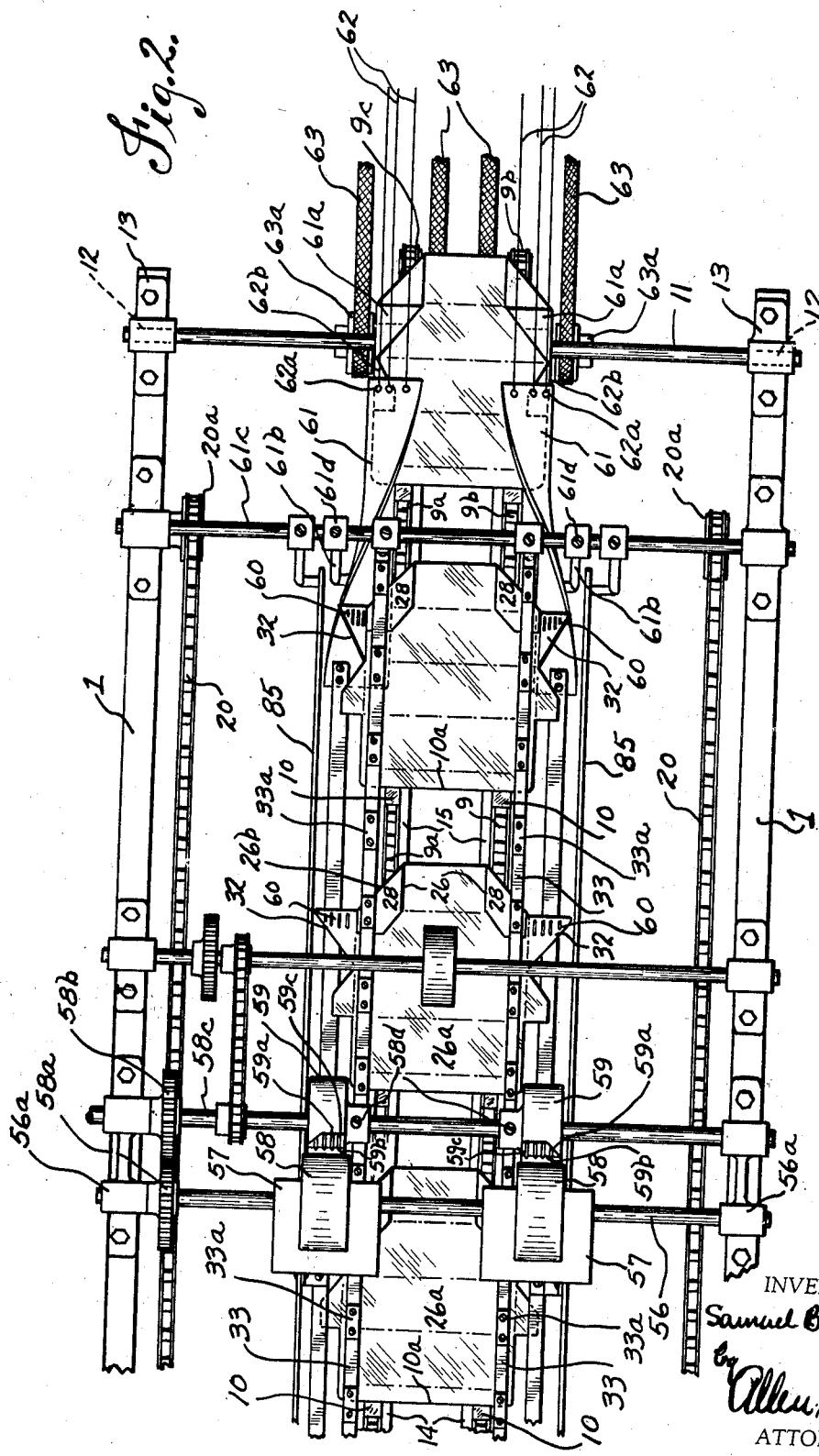

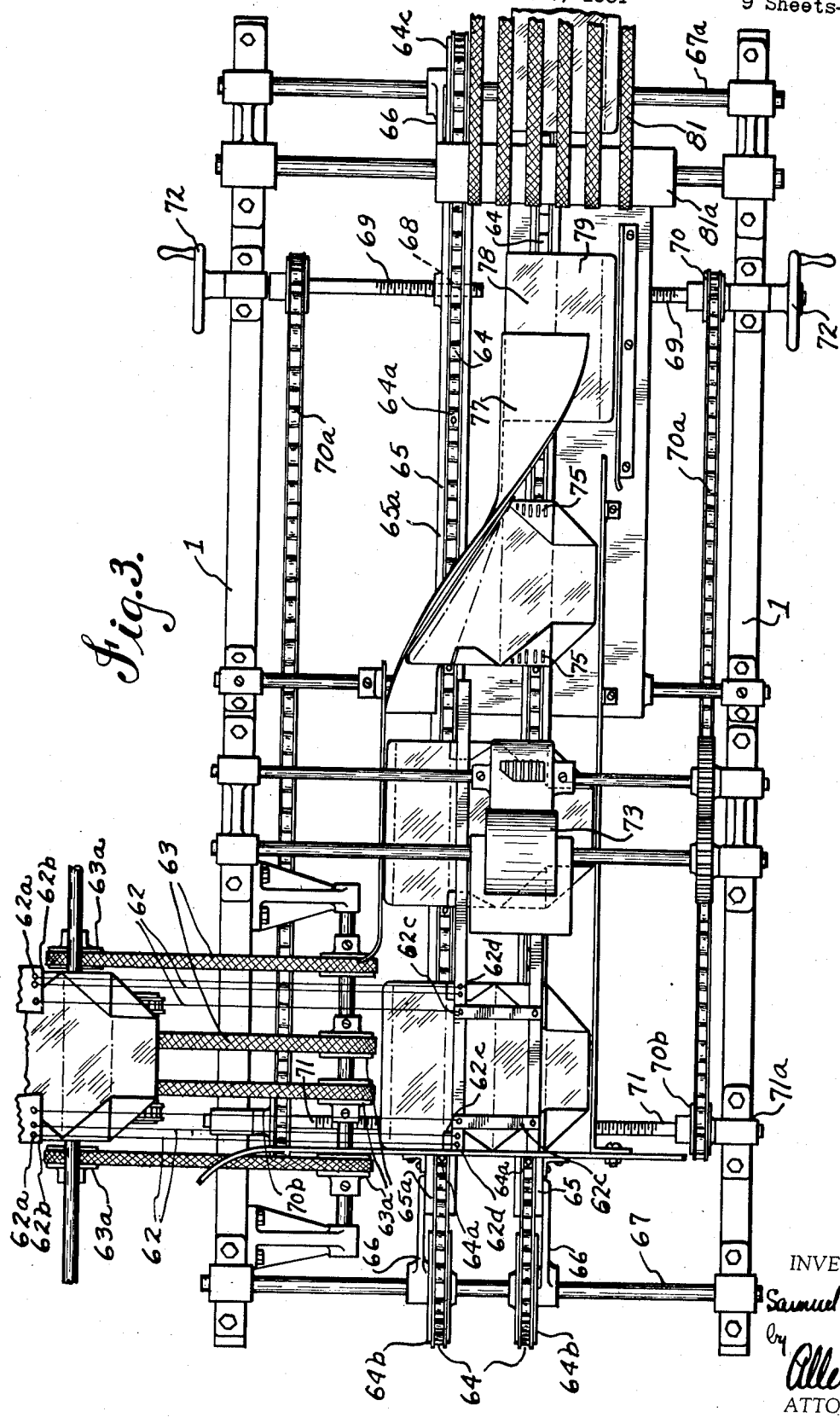

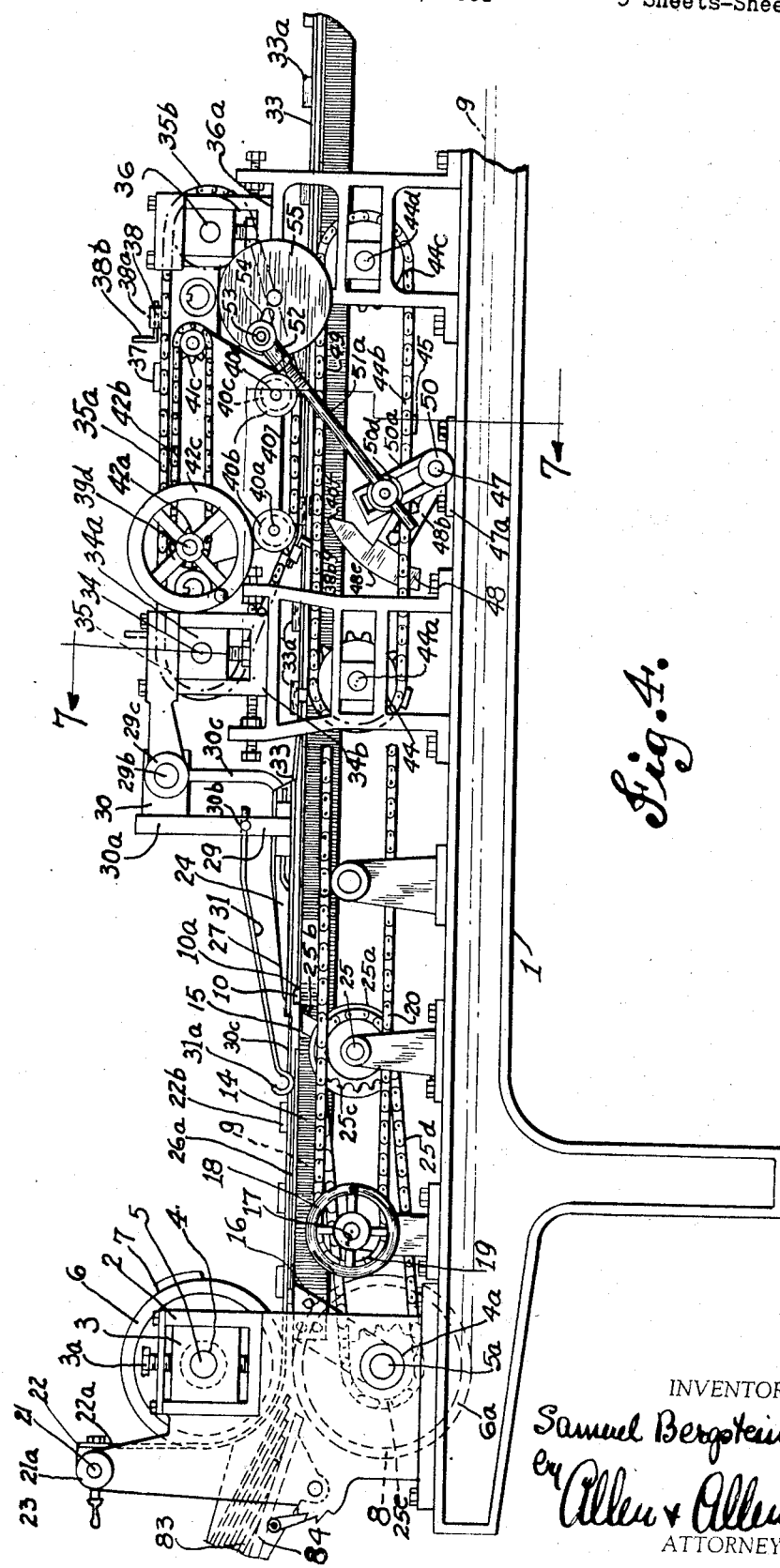

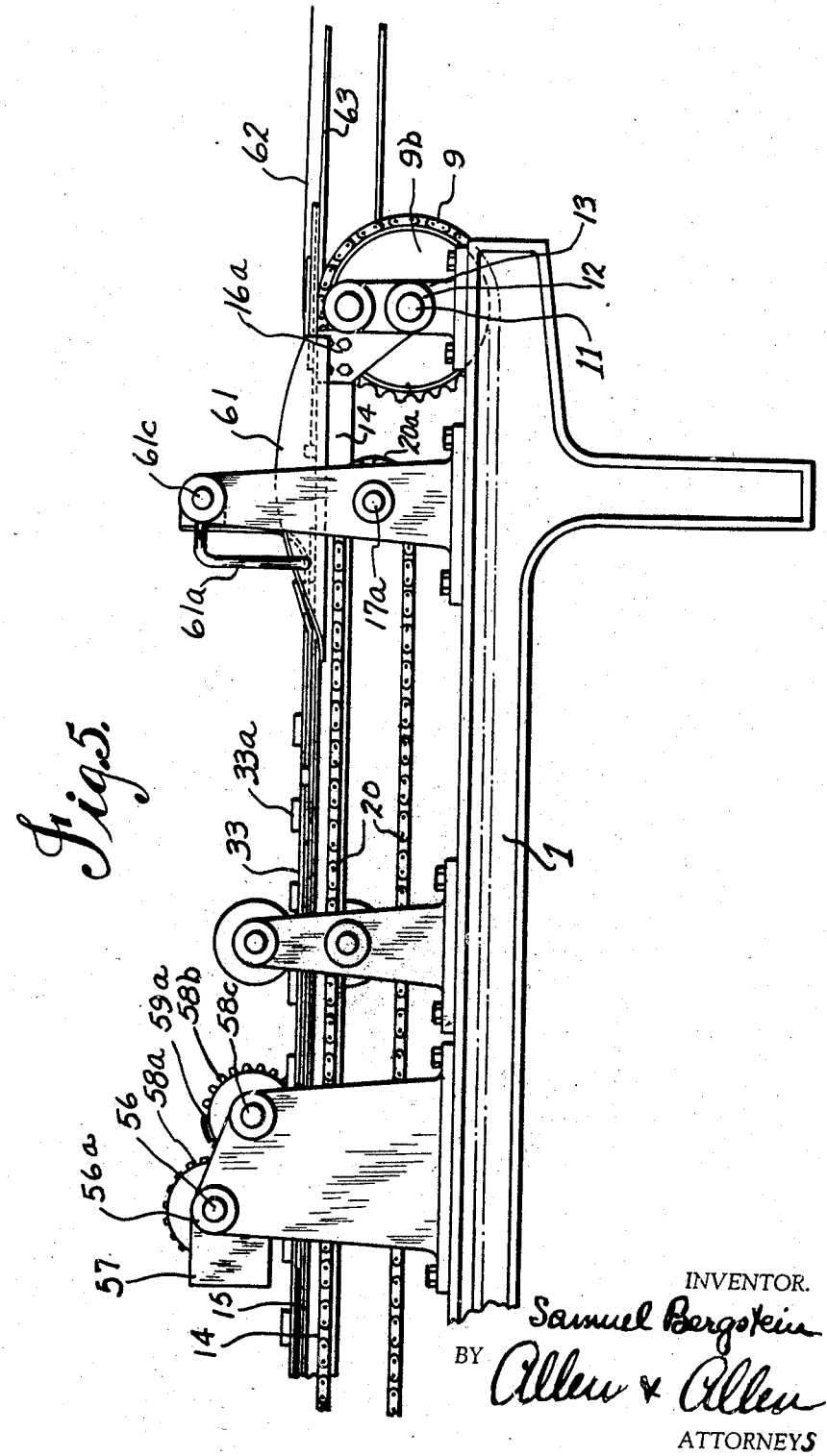

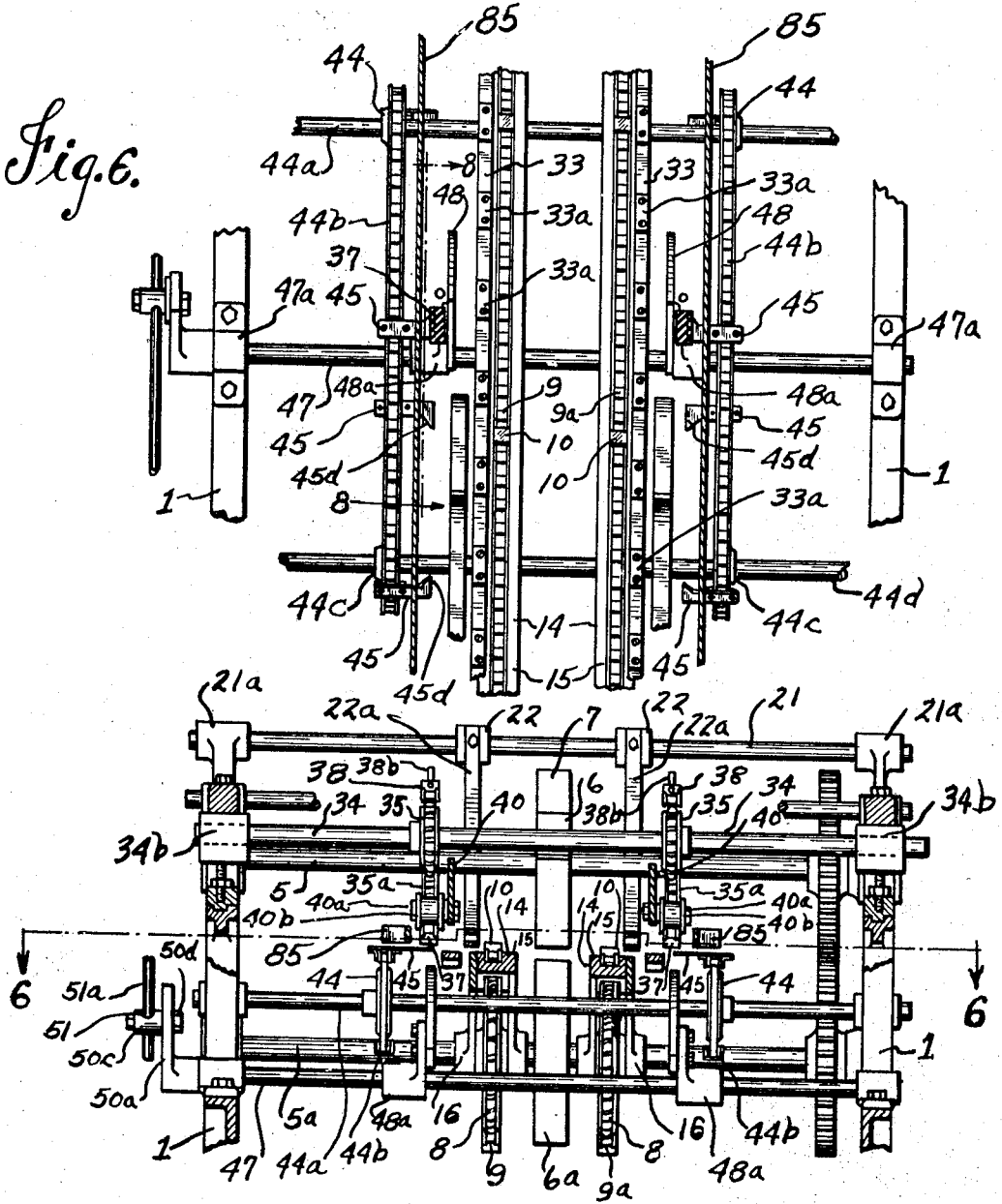

INVENTOR.
Samuel Bergstein
BY Allen & Allen
ATTORNEYS

June 12, 1934.  S. BERGSTEIN  1,962,759
MACHINE AND METHOD FOR MAKING KNOCKDOWN BOXES
Filed Oct. 9, 1931  9 Sheets-Sheet 8

INVENTOR.
Samuel Bergstein
BY Allen & Allen
ATTORNEYS

June 12, 1934.  S. BERGSTEIN  1,962,759
MACHINE AND METHOD FOR MAKING KNOCKDOWN BOXES
Filed Oct. 9, 1931   9 Sheets-Sheet 9

INVENTOR.
Samuel Bergstein
BY Allen & Allen
ATTORNEYS

Patented June 12, 1934

1,962,759

UNITED STATES PATENT OFFICE 1,962,759

MACHINE AND METHOD FOR MAKING KNOCKDOWN BOXES

Samuel Bergstein, Cincinnati, Ohio

Application October 9, 1931, Serial No. 567,923

18 Claims. (Cl. 93—49)

My invention relates to the methods and means for making boxes of the type known to the art as knock-down or wall boxes. It relates specifically to a method and means for making boxes that are as deep as they are wide.

My present machine is proposed as an improvement in machines for making knock-down boxes insofar as it overcomes the limitations of previous machines to certain types of boxes in which the depth of the boxes is approximately half or less than the width. The machine as described in this application is applicable to a greater range of sizes, and is capable of producing knock-down boxes whose depth is as great as its width.

In my co-pending applications Serial No. 516,971, filed February 19, 1931, and Serial No. 534,338, filed May 1, 1931, certain types of knock-down boxes have been illustrated. It will be noted that these boxes have their side panels folded down when the boxes are in a knock-down condition. The depth of this style of box is limited to, or less than, one-half the width of the box. It is further well known that knock-down boxes may be prepared by diagonally scoring the ends of a box from a point beginning at the middle of the upper edges of the end flaps and extending to the outer lower corners of the end flaps, thus forming a flap wall with an isosceles triangle, with its apex a right angle at the middle of the lower edge of the flap and with its legs forming the hypotenuses of one-half sized right triangles whose apices lie at the outer corners of the lower outer edge of the flap. Such a scored flap will fold inwardly, but such a folding arrangement limits the depth of the box to one-half its width.

From the foregoing it can be understood that specifically my object is to provide a machine for making boxes having a greater depth than one-half the width. In this new application describing my improved machine, it will be apparent that the principle involved is such as to overcome the limitations of the previous machines and to make it possible to make knock-down boxes with depths that are not limited to one-half the width of the box and with depths even equal to the widths.

It is an object of my invention to provide a box from a cut and scored blank capable of being folded over at its front and with the end flaps provided with diagonal fold lines, and to thereby produce continuously boxes equal in depth and width, while passing through my machine. I further provide end reinforcing flaps which are triangular in shape with sides extending along the diagonal fold lines of the outer end flaps.

It is another object of my invention to make boxes from cut and scored blanks, capable of being folded over on the front wall and end walls, thereby further avoiding any limitations as to depth with relation to the width of the boxes.

It is an object of my invention to provide a machine in which it is possible to feed cut and scored blanks of this type successively and continuously through the machine while performing the various steps of turning over and gluing and then delivering the finished knock-down boxes at right angles to the original starting line of the box blanks.

Broadly it is the object of my invention to provide a machine that will produce knock-down boxes having no limitation of depth to width in a series of steps, starting with automatic feeding of the blanks, turning up of the front end flaps by means of a rotating member, folding these said flaps rearwardly by means of a turn-over plate, folding the end diagonally scored flaps downwardly, applying glue to portions of the front or end flaps, which will overlap, folding the reinforcing end flaps inwardly and parallel with the sides of the blank body, transferring the blank to a right angled feeder and folder, applying glue to desired areas of the blank, adhesively securing the turned over flaps, and then folding the blank along a medial longitudinal line of wall juncture for the final fold to complete the knock-down box.

These and other objects will be more specifically pointed out in the specifications and the drawings forming part of this specification, in which I describe and illustrate a preferred embodiment of my machine.

In the drawings:—

Figure 1 is a plan view showing the feed rolls, turn-over plates, side panel turning mechanism and delivery mechanism to the gluing rolls.

Figure 2 is a plan view of a continuation of Figure 1 showing the continuation of the feed to the gluing rolls, the gluing rolls, other turn-over plates, and the delivery mechanism to the right angled feeder and folder mechanism.

Figure 3 is a top plan view of the machine showing the feeding conveyor, gluing roll, turn-over plates and feed from the machine.

Figure 4 is a side elevation showing the parts shown in Figure 1.

Figure 5 is a side elevation of the parts shown in Figure 2.

Figure 6 is a section taken along the line 6—6 of Figure 7.

Figure 7 is a section along the line 7—7 of Figure 1.

Figure 8:
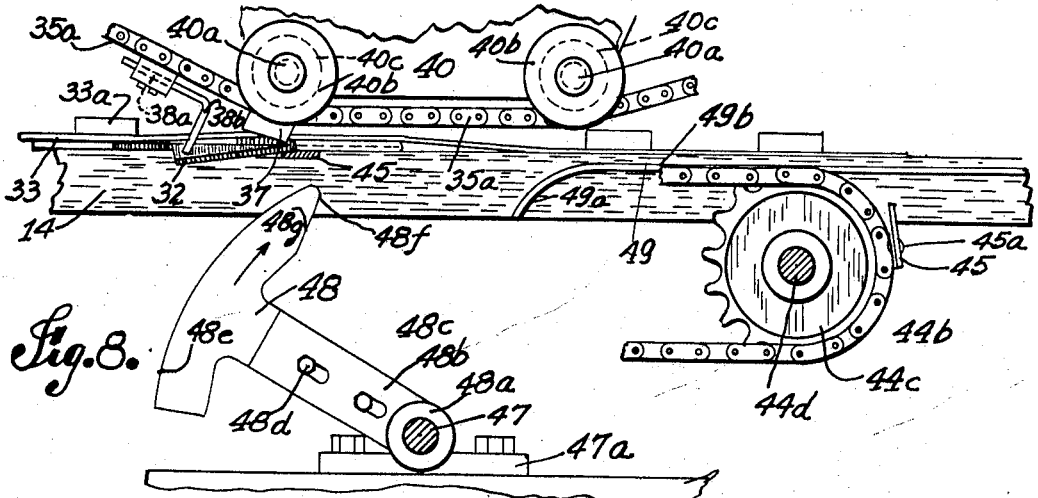
Figures 8, 9 and 10 are detail views showing the positions of the oscillating members and the turn-over fingers during the operation of turning down the side panels.

On the main supporting frame 1 I have rigidly mounted bearing block standards 2 in which are adjustably mounted bearing blocks 3 that are held in set position by means of the set screws 3a. Holes 4 are provided in the blocks to rotatably mount therein a splined shaft 5 upon which is adjustably and slidably mounted a feeding disc 6 which has a frictional contact member 7 fixedly mounted thereon. Another lower feeding disc 6a beneath the disc 6 is also adjustably and slidably mounted on another splined shaft 5a which is rotatably mounted in bearings 4a provided on the main frame of the machine. These discs feed one box blank at a time in timed relation with a conveyor chain to be described.

On the shaft 5a two spaced sprockets 8 are adjustably mounted. The sprockets drive endless block chains 9 and 9a, which have abutments 10 fixed thereon at definite intervals which engage the edges 10a of the blanks, and which thereby carry the blanks through the machine. The blanks remain in contact with the abutments and move continuously during the gluing and folding operations. The chains extend the full length of this part of the machine and pass around other spaced sprockets 9b and 9c that are adjustably mounted on a splined shaft 11, which shaft is rotatably mounted in the journal openings 12 in bearing blocks 13 which are rigidly fastened to the main frame.

The conveyor chains are guided in channel members 14, so that the abutments will extend above the surface of the channel members while the chains are deep enough in the grooves of the channels so as not to contact with the blanks while carrying them through the machine. With this arrangement the top surfaces 15 of the channels present a smooth surface on which the blanks will slide without interference. The channels are rigidly connected to brackets 16 and 16a that are slidably supported on the shafts 5a and 11, but which are not rotatable therewith, and the channels, together with the sprockets and conveyor chains, are moved simultaneously by means of screws 17 rotatable in bearings provided on the main frame. A wheel 18 is fixed to the ends of the screws and the wheel provides means for rotating the screws. A sprocket 19 is fixed to the screws and the sprocket drives a chain 20 extending to other sprockets 20a fixed on other screws 17a. These chains cause both ends of the conveyor to move at the same time, because the rotation of the wheel will rotate the screws which in turn rotate the sprockets 19 and 20a by means of the chain 20.

A shaft 21 is fixedly mounted in bearings 21a mounted on the main frame. On this shaft I have adjustably mounted bosses 22 which are held in place on the shaft by means of wing set screws 23. To these bosses are rigidly attached flexible spring strips 22a to hold the blanks down on the conveyor chains until the blanks pass under the turn-over plates 24. The flexible spring strips are counterweighted by means of weights 22b spaced at definite intervals.

Adjustably mounted on a shaft 25 are discs 25a in which are fixedly mounted trip fingers 25b rotatable with the shaft in timed relation to the conveyor chain. These discs and shaft rotate in a clockwise direction and the trip fingers push upwardly on the sections 26 of the blanks 26a and break the blanks along the score lines 26b, so that these sections will extend upwardly and be in a position to readily pass under the turn-over plates 24. This operation occurs during the continuous movement of the blank through the machine as is the case with all other operations performed on the blank while folding the flaps of the box. The discs are driven by means of a sprocket 25c fixed on the shaft and a chain 25d driven by a sprocket 25e fixed on and rotated by the shaft 5a.

The blank continues to move forward until the flaps 26 come in contact with the surfaces 27 of the turn-over plates which gradually turn the flaps down flat against the body of the blank into the position as shown at 28.

In order to accommodate various sizes of boxes, I support the turn-over plates on downwardly extending posts 29 which are integral with bosses 29a. The bosses 29a are adjustably supported on a bar 29b which is rigidly supported in bearings 29c also rigidly supported on the main frame of the machine. Adjustably mounted on the bar 29b are other bosses 30 with downwardly extending arms 30a having holes 30b for adjustably supporting rods 31. The rods 31 have bent ends 31a so that the sides 32 of the blank will readily slide underneath and be held in position while the trip fingers break the front flap. Other hold-down bars 30c are supported on the bar 29b and hold the center of the blank down on the conveyor chains.

Rigidly attached to the posts supporting the turn-over plates are other flexible steel strips 33 with counterweights 33a to hold down the bent over flaps 26 until they reach the glue applying rolls to be described. These hold-down strips are sufficiently flexible so that they will conform to the irregularities of the folded blank and thereby prevent the distortion of the folded ends while passing through the machine.

A shaft 34 is rotatably mounted in bearings 34a adjustably mounted in bearing brackets 34b that are rigidly attached to the main frame of the machine. This shaft rotates sprockets 35 which are adjustably mounted thereon and drive endless chains 35a which in turn drive other sprockets 35b adjustably mounted on another shaft 36 rotatably mounted in adjustable bearing brackets 36a. On the chain 35a are fixed compressible members 37 made of rubber and the like mounted on the chain so as to function in proper timing with the main conveyor chains and other chains to be described. Directly behind the compressible members on the chains are fixed blocks 38 having holes 38a therein for adjustably supporting L-shaped push down fingers 38b that push the side flap portions 38c down prior to the complete bending under operation. These push down fingers also operate in timed relation to the main conveyor chains.

Cross slide supporting bars 39 with splines 39a are rigidly supported on the main frame of the machine and guide thereon in a slidable manner cross slide heads 39b. These heads have threaded holes 39c for screws 39d that are rotatably mounted in bearings 39e provided in standards rigidly supported on the main frame of the machine. A plate 40 rigidly attached to the cross-slide head 39b extends over to and is rigidly attached to other cross-slide heads 41 slidably supported on another cross-slide supporting bar 41a. The heads 41 also have threaded holes 41b for screws 41c rotatably supported in other standards 41d rigidly supported on the main frame of the machine. On the outer ends 42 of the screws are fixed sprockets 42a connected together by chains 42b that cause the screws to rotate with each other when hand wheels 42c are rotated to vary the distance between the chains 35a. The ends of the cross-slide heads have slots 43 for retaining the sprockets 35 and 35b and provide the means for moving the sprockets along their respective shafts while adjusting the chains for a desired width of box.

Figure 9:
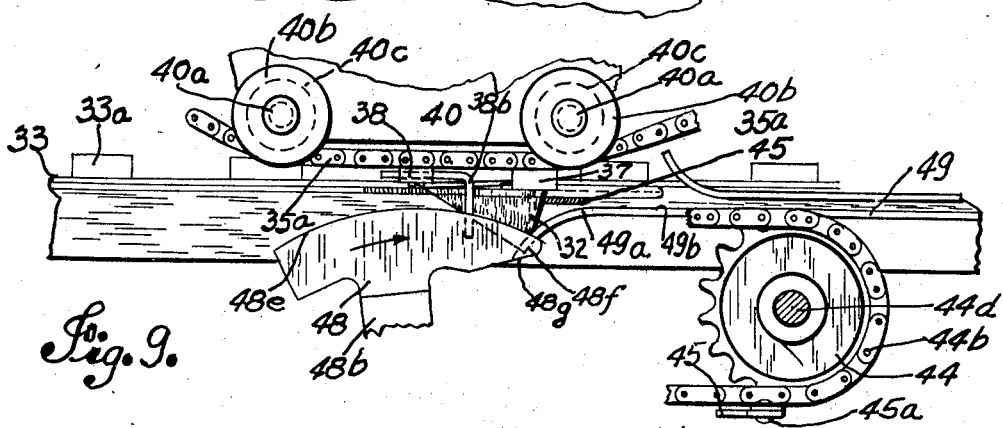
Figure 10:
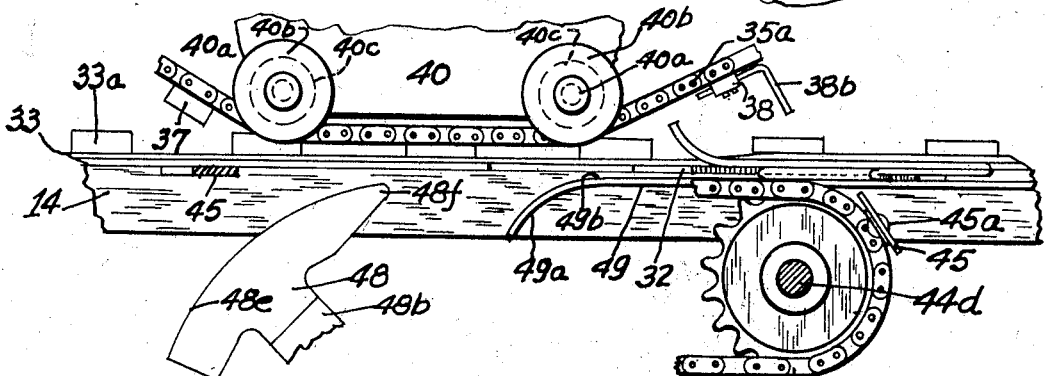

The plate 40 has studs 40a rigidly supported therein for rotatably supporting sheaved guide rollers 40b having grooves 40c to retain the chains and guide them down into the position shown in Figures 8, 9 and 10, so that the compressible members and push-down fingers on the chain will come in contact with the flaps 32 of the blank.

Figure 11:
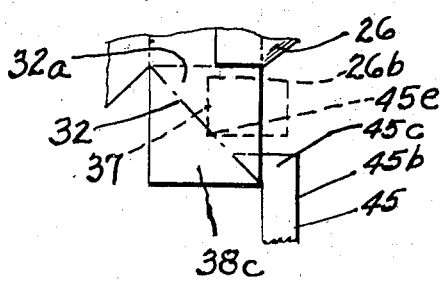
Figure 11 is a detail view showing the relative positions between the angle plate and the side panel of a box before it has been turned down.

Other sprockets 44 are adjustably mounted on a shaft 44a rotatably mounted in bearings supported on the main frame of the machine. Chains 44b extend from these sprockets to other sprockets 44c adjustably mounted on another shaft 44d that is rotatably mounted in bearings supported on the main frame of the machine. On the chains there are plates 45 rigidly attached by means of rivets 45a. These plates have a rectangular section 45b terminating in a wider section 45c with a beveled side 45d corresponding to the score line 45e of a blank as shown in Figure 11. These plates on the chains travel in timed relation with the main conveyor chains and with the compressible members and the push down fingers on the other chains which have just been described. The plates provide the means for supporting the flaps while the push down fingers start to press down the triangular sections 38c of the sides 32 of the blank preparatory to the turning under operation to be described.

A shaft 47 is rotatably mounted in bearings 47a fixed to the main frame. The shaft supports and oscillates T-shaped members 48. The members 48 are adjustably mounted on the shaft and have hubs 48a integral with arms 48b. The arms 48b have slots 48c for adjustably supporting the T-shaped members. The T-shaped members are held in set position on the arms by means of the bolts 48d. The top surface 48e of the T-shaped members is curved and is concentric with the center of the shaft. This top terminates in a rounded point 48f having a sloping side 48g which turns the portions 38c of the sides under so that they will be held down in that position while riding on the top surface of a guide rail.

As shown in Figures 8, 9 and 10, the guide rail 49 has a curved end 49a which allows the turned under part of the side flaps to easily start sliding over the top surface 49b of the guide rail and thereby complete the turning under operation. These rails are supported on the channels 14 which support the main conveyor chains and they are adjustable with them. The guide rail extends from the position shown in Figures 8, 9 and 10 up to other turn-over plates which turn the side panels upwardly, inwardly, and downwardly so that the proper portions will contact with flaps 86 which are articulated to the flaps 26 and adhere to the flaps 86. Glue is applied preferably to the flaps 86.

On the outer end 50 of the oscillating shaft is fixed a crank 50a. The arm 50b of the crank has a slot 50c for adjustably retaining a stud 50d upon which is rotatably mounted a hub 50e. The hub has a hole 51 for a connecting rod 51a which is fixed therein in set position by means of a set screw 51b. The other end of the rod has a threaded end 51c that screws into a threaded boss extending at right angles from a knuckle bearing 52a rotatably mounted on a stud 53 that is adjustably mounted in a slot 54 of a rotatable disc 55. The setting of the stud with relation to the center of the rotatable disc determines the amount of arc of oscillation of the oscillating member. The rotatable disc is rotatably mounted on a stud 55a that is fixed on the main frame of the machine. A spur gear 55b is fixed to the rear of the rotatable disc and meshes with another spur gear that is fixed on a shaft rotatably mounted in bearings on the main frame. This last mentioned shaft drives the rotatable disc which in turn actuates the crank and T-shaped oscillating members.

While I have indicated and described T-shaped oscillating members for turning the sections of the side panel under, I do not wish to limit myself to this particular shape of mechanism. A circular rotating disc with extending fingers can be used to equal advantage as can readily be seen by reference to the means I employ in the first operation on the blank while turning the front flap upwardly.

A shaft 56 is rotatably mounted in bearings 56a which are fixed on the main frame. This shaft extends through glue reservoirs 57 which are adjustably supported on brackets (not shown) which are mounted on the main frame of the machine. Glue transfer rolls 58 are adjustably mounted on the shaft and are rotated by it. A spur gear 58a is mounted on one end of the shaft to drive the shaft. Another spur gear 58b meshes with the last mentioned gear and is fixed on another shaft 58c which is rotatably mounted in bearings on the main frame. This last mentioned shaft is the drive shaft for the glue rolls.

Adjustably mounted and held in position by means of set screws 58d are drums 59 having glue applying sectors 59a fixed thereon. The sectors 59a have raised portions 59c and grooves 59b. The raised portions are the only part of the glue applying sectors which contact with the transfer rolls and they deposit the glue on the blank preferably over the area of the flaps 86, as shown at 60. By applying the glue in stripes, the amount deposited is more easily controlled and unnecessary spreading is prevented.

After the glue has been applied, the blanks are carried towards other turn-over plates 61 which turn the bent sides over so that they will adhere to the flaps upon which glue has been applied as shown at 61a. These turn-over plates are rigidly attached to arms 61b integral with bosses which are adjustably mounted and held in position on a fixed bar 61c by means of set screws 61d.

After leaving the turn-over plates the side flaps are held down and prevented from springing upward by means of wires 62 which are secured at one end 62b to the turn-over plates with screws or rivets 62a, and at the other end 62c by rivets 62d mounted in a frame 62e rigidly supported on the frame of the machine.

Canvas belts 63 driven by pulleys 63a carry the blanks, which are now partially formed knockdown boxes, and continue their movement after they leave the chain conveyors having the abutments. These endless canvas conveyors provide means for moving the blanks onto the right angled feeder and folder end of the machine. The blanks are then projected onto endless chain conveyors 64 having abutments 64a which feed the blanks at right angles to their previous direction of feed.

The endless chain conveyors 64 are driven by means of spaced sprockets 64b at one end and other sprockets 64c at the other end of this part of the machine. These chains are supported and guided in grooved channels 65 so that only the abutments will extend above the top surface 65a and thereby prevent the chain from contacting with the blank while it is carried through the machine. These grooved channels are rigidly supported on brackets 66 which are adjustably supported on rotatable shafts 67 and 67a. The brackets are slidably mounted on the shafts but do not rotate with them.

The grooved members have threaded holes 68 for adjusting screws 69 which are rotatably mounted in bearings provided on the main frame. On these screws there are fixed sprockets 70 over which extend endless chains 70a to other sprockets 70b which are fixed on screws 71. The screws 71 are rotatably mounted in the main frame at one end 71a and rotate in threaded holes in the grooved channels at the other end. Hand wheels 72 are provided to rotate the screws at the same time because of their chain connection.

Another glue applying mechanism 73 with details of construction the same as the one previously described is provided for preferably applying glue to the flaps 38c in stripes 75 as shown. As has been mentioned before the glue or other adhesive is applied in this manner so that there will be a minimum of spreading while forcing the flaps together so that they can adhere to each other.

Another turn-over plate 77 is provided to turn the back side 78 and top 79 down into the position shown in Figure 3. This is the last operation performed on the machine in the formation of the knock-down boxes.

After leaving the turn-over plates the boxes pass under endless canvas belts 81 driven by means of rollers 81a and other rollers, not shown, so that the glued parts will be held together until they are stuck fast to each other. The length of these belts will be determined by the drying time required.

Figure 12:
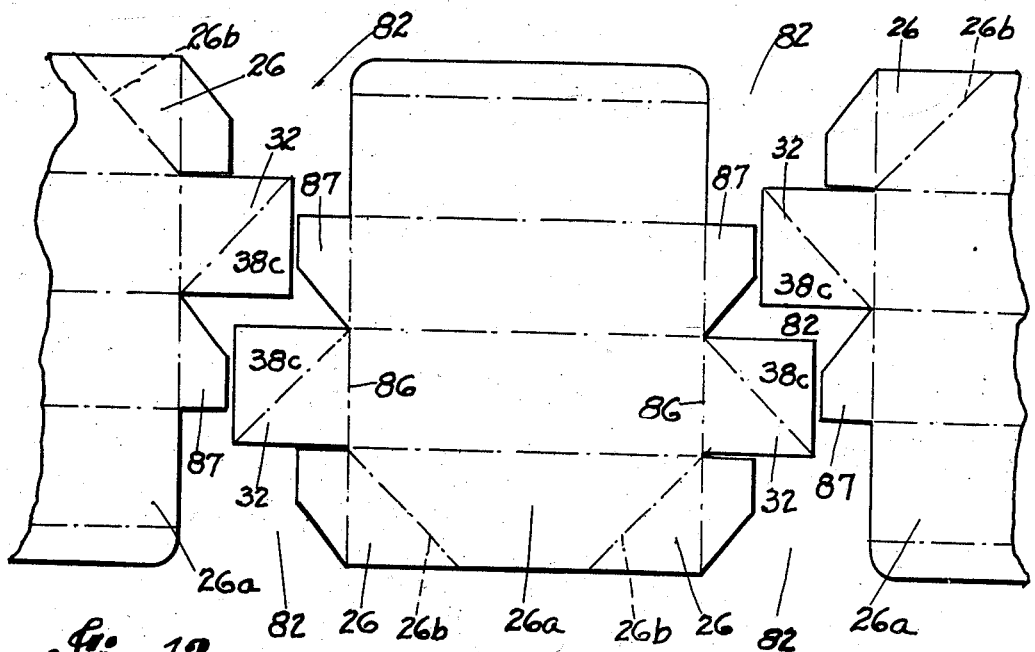
Figure 12 is a plan view showing the position of the blanks as they are cut and scored in a sheet of board.
Figure 13:
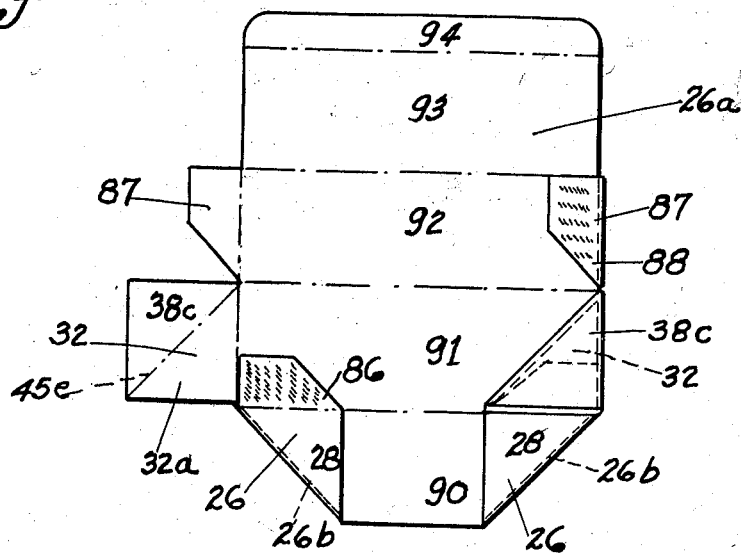
Figure 13 is a plan view of a box blank with one end side glued and pasted and the other side with glue applied preparatory to the turning over.

Referring to Figure 12, it will be seen that the method of inverting the blanks has been employed and results in a considerable saving of board because the amount of waste which will occur in the sections 82 has been considerably reduced.

After cutting and scoring the blanks, they are piled into a hopper 83 having an inclined base 84. This hopper is adjustable and positions the flat blanks so that the frictional member 7 on the feed roll can come into contact with them and project them into the proper position so that the abutments on the chain will impinge against the edges of the blank and begin carrying them through the machine. These feed rolls are in a timed relation to the abutments on the chains. Guide rails 85 are provided throughout the machine so as to keep the blanks in proper alignment with relation to the members that perform the operations on the blanks.

As the blanks pass the rotating discs 25a the trip fingers will come into contact with the flaps 26 and push them upwards and fold along the score line 26b. While the trip fingers are pushing the section up the hold-down bars will be in contact with the side panels 32 and prevent bending along their score lines 86. The blanks are in continuous movement, and after leaving the trip fingers they will immediately be turned down into a position as indicated at 28 by passage underneath the turn-over plates.

After being carried under the turn-over plates, the blanks will come to the station where the operations on the side panels are performed. The compressible members, the side flaps, and the plates 45 will come together at the same time. The side panel will be between the compressible member and the plates, and when they reach a horizontal position the section 32a of the side flap 32 will be held firmly on the top surface of the plate while passing thereacross. The score line 45e will be in line with the beveled edge of the plate. The beginning of the clamping operation is shown in Figure 8. The push-down fingers following behind the compressible members will then push the sections 38c down, as can be seen by referring to Figures 8 and 9. The oscillating member will come up and push the turned down section of the side flap back far enough so that it will come into contact with the curved end of the guide rail and complete the turning under operation.

The blank then passes under the glue applying rolls and glue is applied to the section 86 or 32a in the manner as shown at 60. It is then carried forward, where it arrives at other turn-over plates and the flaps are turned over and stuck fast together as at 63a of Figure 2. The side panels are held from turning up from the last mentioned position and are continued along in their movement by the canvas belts. These belts carry the blanks over on to other endless conveyors with abutments which are at right angles to the main conveyor chains.

The other conveyor carries the blanks under other glue applying rolls which apply glue to the flaps 87 which were previously turned over to the position shown at 88 by the last mentioned turn-over plates. After the application of the glue the blank passes under turn-over plates which fold the blank over along the line 89 which is the last operation in the folding and gluing of the completed knock-down box. After the turning over the box passes under pressure applying belts in order to give the glue proper time to dry.

Figure 14:
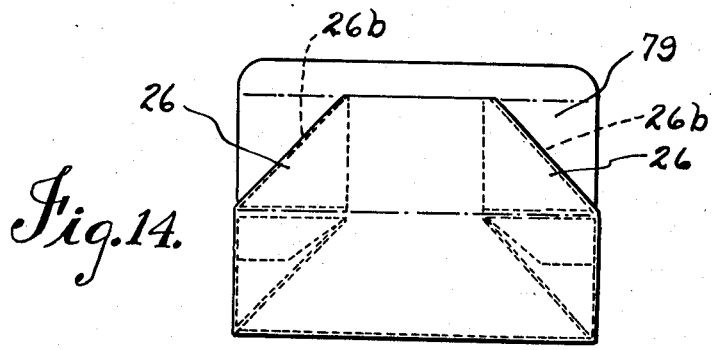
Figure 14 is a plan view of the completed knock-down box ready for shipment.
Figure 15:
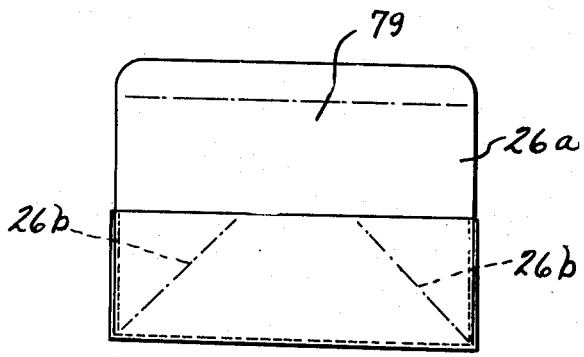
Figure 15 is a front elevation of the box with the lid folded up.
Figure 16:
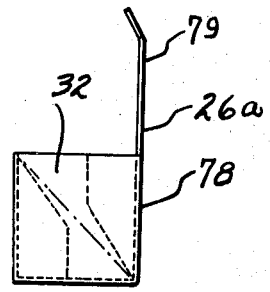
Figure 16 is a side elevation of a carton showing the relation of the flaps to each other.
Figure 17:
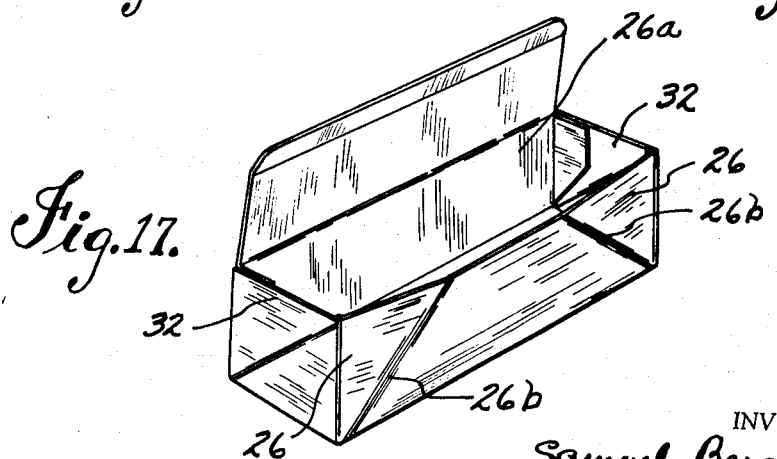
Figure 17 is a perspective view of a carton in open position when it is ready to receive materials to be placed therein.

The boxes produced on my machine consist of a front flap 90 with diagonal scored lines 26b and connecting flaps 86 integral with the front panels. The bottom sections are indicated at 91 and have the diagonal scored side panels 32 integral therewith. The back panel 92 has connecting flaps 87 for pasting to the side panels 32. The top section is indicated at 93 with a tongue 94. This particular method of cutting and scoring produces a knock-down box that is equal in depth and width and can be folded in the manner shown in Figure 14.

While no main drive has been illustrated or described, any standard drive for the various units comprising my machine may be used, and the proper driving elements will readily occur to those skilled in the art.

In the description and claims which follow I have referred to the carton as having a bottom wall, a front wall, a back wall, end walls, a cover flap and sealing flaps. It should be understood that the reference to such specific portions of the blank are merely for purposes of clarifying the description. The size of the end walls might be greater than the size of the side walls, in which case the end walls would ordinarily be referred to as side walls. The specific description, however, refers to the parts of the carton presented to the folding and sealing mechanism rather than as limitations to the size or shape of the various parts of the box.

Having thus described my invention, what I claim as new and desire to secure by Letters Patent, is:—

1. A machine for forming knock-down containers from a cut and scored blank having a portion scored to form the bottom of the container, portions scored to form the front and back side walls of the container, portions scored to form diagonally scored end walls of the container, portions articulated to the ends of the side wall portions to form sealing flaps, and a portion scored to form a cover for the container comprising means for continuously moving said blanks, means for first folding back against the bottom, portions of the front wall of the blank including the sealing flaps articulated thereto, means for folding down the end flaps along the diagonally scored lines, means for applying adhesive to the infolded sealing flaps, means for then folding inwardly the folded end flaps and folding inwardly the sealing flaps articulated to the back side wall, means for delivering said blank to a right angle feeder, means for applying adhesive to the infolded sealing flaps articulated to the back side wall, and means for folding over the blank along the line of articulation of the bottom and back side wall to form a completed knock-down container.

2. A machine for forming knock-down containers from a cut and scored blank having a portion scored to form the bottom of the container, portions scored to form the front and back side walls of the container, portions scored to form diagonally scored end walls of the container, portions articulated to the ends of the side wall portions to form sealing flaps, and a portion scored to form a cover for the container comprising means for continuously moving said blanks, means for first folding back against the bottom portions of the front wall of the blank including the sealing flaps articulated thereto, means for folding down the end flaps along the diagonally scored lines, means for applying adhesive to the infolded sealing flaps, means for then folding inwardly the folded end flaps and folding inwardly the sealing flaps articulated to the back side wall, means for delivering said blank to a right angle feeder, means for applying adhesive to the infolded sealing flaps articulated to the back side wall, means for folding over the blank along the line of articulation of the bottom and back side wall to form a completed knock-down container, and means for supporting portions of said diagonally scored end walls during the downward folding of the other portions thereof.

3. The steps in the manufacture of knock-down boxes having a depth of more than half their width, which consists in providing blanks each of which has scored portions forming a bottom, front and back side walls with flaps articulated to the ends of the front and back side walls to form sealing flaps and end walls with diagonally scored lines, and then moving the blanks without pause, folding back triangular portions of the front wall including the sealing flaps articulated thereto, folding the end flaps downwardly along their diagonally scored lines, applying adhesive to portions to be adhered, then folding inwardly toward the bottom the folded end flaps and causing the end flaps to adhere to infolded portions of the front wall.

4. The steps in the manufacture of knock-down boxes having a depth of more than half their width, which consists in providing blanks each of which has scored portions forming a bottom, front and back side walls with sealing flaps articulated to the ends of the front and back walls, diagonally scored end walls and a top articulated to the back wall, and then folding back triangular portions of the front wall including the sealing flaps, folding the end flaps downwardly along their diagonally scored lines, applying adhesive to portions to be adhesively secured together, folding the folded end flaps inwardly toward the bottom causing portions of the folded end flaps to adhere to the sealing flaps articulated to the infolded portions of the front wall, folding in the sealing flaps articulated to the back wall, applying adhesive to portions of the carton to be adhesively secured together, and then folding the blank along the line of articulation between the bottom and back wall to form a knock-down container of the character specified.

5. The steps in the manufacture of knock-down boxes having a depth of more than half their width, which consists in providing blanks each of which has scored portions forming a bottom, front and back side walls with sealing flaps articulated to the ends of the front and back walls, diagonally scored end walls and a top articulated to the back wall, and then folding back triangular portions of the front wall including the sealing flaps, folding the end flaps downwardly along their diagonally scored lines, applying adhesive to portions to be adhesively secured together, folding the folded end flaps inwardly toward the bottom causing portions of the folded end flaps to adhere to the sealing flaps articulated to the infolded portions of the front wall, folding in the sealing flaps articulated to the back wall, applying adhesive to portions of the carton to be adhesively secured together, and then folding the blank along the line of articulation between the bottom and back wall to form a knock-down container of the character specified, and during the downward folding of portions of the diagonally scored end walls, supporting flatwise, portions of said end walls not to be folded downwardly.

6. The method of making a knock-down box from a cut and scored blank which consists in bending upwardly triangular portions of a front wall having sealing flaps articulated thereto folding said triangular portions and flaps rearwardly, folding diagonally scored end flaps downwardly, folding the folded end flaps inwardly and applying adhesive to secure portions of said end flaps to said sealing flaps, folding in sealing flaps attached to the back of said box, applying adhesive to secure portions of said sealing flaps to portions of said end walls, and then folding said blank on the score line between the bottom and back wall to form said knock-down box.

7. In a machine of the character specified, blank carrying mechanism, devices for folding each two marginal portions of a blank that lie at right angles to each other along diagonal lines at right angles to each other, and a device for folding marginal portions of the blank along lines longitudinally of the blank all of said devices effecting the folding during the continuous operation without pause of said blank carrying mechanism.

8. In a machine of the character specified, blank carrying mechanism, means for folding marginal portions of a blank along diagonal lines, means for folding marginal portions of the blank along lines longitudinally of the blank during the continuous operation without pause of said blank carrying mechanism, and means for diagonally folding other marginal portions of the blank prior to the folding operation along lines longitudinal of the blank.

9. In a machine of the character specified, blank carrying mechanism, means for folding marginal portions of a blank along diagonal lines, means for folding marginal portions of the blank along lines longitudinally of the blank during the continuous operation without pause of said blank carrying mechanism, and means for diagonally folding other marginal portions of the blank prior to the folding operation along lines longitudinal of the blank, said last named means comprising means for supporting sections of said other diagonally folded marginal portions while other sections thereof are diagonally folded.

10. In a machine of the character specified, blank carrying mechanism, means for folding marginal portions of a blank along diagonal lines, means for folding marginal portions of the blank along lines longitudinally of the blank during the continuous operation without pause of said blank carrying mechanism, and independent feeding and folding mechanism for folding said blank along lines lateral of the blank.

11. In a machine of the character specified, blank carrying mechanism, means for folding marginal portions of a blank along diagonal lines, means for folding marginal portions of the blank along lines longitudinally of the blank travel during the continuous movement without pause of said blank, independent carrying and folding mechanism for folding said blank along lines lateral of the blank travel, and means for applying adhesive to said blank prior to the folding along lines longitudinal of the blank travel.

12. In a machine of the character specified, blank carrying mechanism, means for folding marginal portions of a blank along diagonal lines, means for folding marginal portions of the blank along lines longitudinally of the blank travel during the continuous movement without pause of said blank, independent carrying and folding mechanism for folding said blank along lines lateral of the blank travel, means for applying adhesive to said blank prior to the folding along lines longitudinal of the blank travel, and means for applying adhesive to the blank prior to the folding along lines lateral of the blank travel.

13. The steps in the method of forming knockdown containers having depth of substantially more than half their width, which consists in progressively and continuously carrying the blanks, folding back portions of the front walls of the blanks along diagonal lines, folding down portions of the end walls of the blanks along diagonal lines, and then folding the diagonally folded end walls along lines longitudinally of the blank travel.

14. The steps in the method of forming knockdown containers having depth of substantially more than half their width, which consists in progressively and continuously carrying the blanks, folding back portions of the front walls of the blanks along diagonal lines, folding down portions of the end walls of the blanks along diagonal lines, then folding the diagonally folded end walls along lines longitudinally of the blank travel, and applying adhesive to secure portions of the front walls to portions of the end walls prior to the folding longitudinal of blank travel.

15. The herein described method of folding and adhesively securing end walls to side walls of paper boxes and delivering same in knocked down form, which consists in folding rearwardly end portions of an advancing wall along diagonal score lines, folding under triangular portions of the end walls, applying adhesive and folding inwardly said triangular folded end walls and, at the same time, folding inwardly sealing flaps extending from the rear walls of the box, causing said end walls when folded to overlie and become adhesively secured to portions extending on diagonally folded front portions of the front walls, applying adhesive, and folding the rear wall and securing said end walls of the box to sealing flaps extending from the rear wall, all the above folding operations being performed when the box blank is in motion.

16. The process of folding box blanks having two opposite edge portions uncut, the other two edge portions being divided into three panels, which process comprises moving the blank through a machine with its multiple-panel edge portions parallel with the direction of movement of the blank, and folding on diagonal lines an outlying one of the three panels of each edge portion in one direction, and thereafter diagonally folding the middle panels in the opposite direction, and then folding these middle panels, folded as aforesaid, as well as the remaining unfolded one of the three panels of these edge portions in the first mentioned direction on lines parallel with the line of movement of the blank, and then folding the blank in said first mentioned direction on lines at right angles to the aforesaid lines of folding, all of said folding being done while the blank is in motion.

17. The process of folding box blanks having two opposite edge portions uncut, the other two edge portions being divided into three panels, which process comprises moving the blank through the machine with its multiple-panel edges parallel with the direction of movement of the blank, and folding on diagonal lines an outlying one of the three panels of each edge portion in one direction, and thereafter folding the middle panels on diagonal lines, and then folding these middle panels, folded as aforesaid, as well as the remaining unfolded ones of the panels of these edge portions in the first mentioned direction along lines parallel with the line of movement of the blank, and then folding the blank on lines at right angles to said line of movement, and applying adhesive in an interim between foldings, to predetermined areas of the edge portions of the blank that are to contact each other upon folding, all of said foldings and applying of adhesive being done while the blank is in motion.

18. A process as set forth in claim 17, in which the adhesive-bearing areas, while in contact due to the folding are subjected to pressure to effect adhesion, also while the blank is in motion.

SAMUEL BERGSTEIN.